United States Patent
Chapman, Jr. et al.

(10) Patent No.: US 7,614,567 B2
(45) Date of Patent: Nov. 10, 2009

(54) ROTATABLE THERMOSTAT

(75) Inventors: John Gilman Chapman, Jr., Delaware, OH (US); George N. Catlin, Grove City, OH (US); Nicholas Ashworth, Dublin, OH (US); Robert Burt, Columbus, OH (US)

(73) Assignee: Ranco Incorporated of Deleware, Carol Stream, IL (US)

( * ) Notice: Subject to any disclaimer, the term of this patent is extended or adjusted under 35 U.S.C. 154(b) by 394 days.

(21) Appl. No.: 11/330,412

(22) Filed: Jan. 10, 2006

(65) Prior Publication Data
US 2007/0158442 A1 Jul. 12, 2007

(51) Int. Cl.
*G05D 23/00* (2006.01)

(52) U.S. Cl. .......................... 236/1 C; 236/94
(58) Field of Classification Search ............... 236/1 C, 236/91 R, 91 D, 91 A, 46 C, 94
See application file for complete search history.

(56) References Cited

U.S. PATENT DOCUMENTS

| | | | |
|---|---|---|---|
| 3,930,611 A | 1/1976 | Demaray | |
| 4,282,591 A | 8/1981 | Andreuccetti | |
| 4,288,990 A | 9/1981 | Schulz | |
| 4,462,540 A | 7/1984 | Dytch | |
| 4,819,714 A * | 4/1989 | Otsuka et al. | 165/217 |
| 4,969,508 A | 11/1990 | Tate et al. | |
| 5,082,173 A | 1/1992 | Poehlman et al. | |
| 5,271,558 A | 12/1993 | Hampton | |
| 5,272,477 A | 12/1993 | Tashima et al. | |
| 5,595,342 A | 1/1997 | McNair et al. | |
| 5,803,357 A | 9/1998 | Lakin | |
| 5,833,134 A | 11/1998 | Ho et al. | |
| 5,924,486 A | 7/1999 | Ehlers et al. | |
| 5,926,364 A * | 7/1999 | Karidis | 361/681 |
| 6,116,512 A | 9/2000 | Dushane et al. | |
| 6,192,258 B1 * | 2/2001 | Kamada et al. | 455/566 |
| 6,213,404 B1 | 4/2001 | Dushane et al. | |
| 6,449,533 B1 | 9/2002 | Mueller et al. | |
| 6,460,774 B2 * | 10/2002 | Sumida et al. | 236/51 |
| 6,502,758 B2 * | 1/2003 | Cottrell | 236/46 R |
| 6,513,723 B1 | 2/2003 | Mueller et al. | |
| 6,581,846 B1 * | 6/2003 | Rosen | 236/46 R |
| 6,595,430 B1 * | 7/2003 | Shah | 236/46 R |
| 6,619,555 B2 * | 9/2003 | Rosen | 236/46 R |

(Continued)

OTHER PUBLICATIONS

LUX PSD111 Series Digital Electronic Thermostat; LUX PSD 111 Series Installation and Operating Instructions Brochure; 2004; 3 pages; © Copyright 2004 LUX Products Corporation.

(Continued)

*Primary Examiner*—Marc E Norman
(74) *Attorney, Agent, or Firm*—Reinhart Boerner Van Deuren P.C.

(57) ABSTRACT

A thermostat that can display information in multiple different orientations is provided. The thermostat includes a housing, a display, and an input device. As the housing is mounted in a particular orientation, the thermostat changes the orientation of the information for properly displaying same to a user. This is accomplished by sensing the orientation of the housing in one embodiment, and through user selection of a desired orientation in another embodiment. A separate display and input device(s) are provided in one embodiment, and a combined touch screen display and input device is provided in another embodiment.

12 Claims, 4 Drawing Sheets

U.S. PATENT DOCUMENTS

| | | | |
|---|---|---|---|
| 6,824,069 B2 * | 11/2004 | Rosen | 236/94 |
| 6,951,306 B2 * | 10/2005 | DeLuca | 236/94 |
| 7,152,806 B1 * | 12/2006 | Rosen | 236/94 |
| 2001/0048030 A1 | 12/2001 | Sharood et al. | |
| 2003/0044000 A1 * | 3/2003 | Kfoury et al. | 379/433.04 |
| 2004/0133314 A1 | 7/2004 | Ehlers et al. | |
| 2005/0043907 A1 | 2/2005 | Eckel et al. | |
| 2005/0064936 A1 * | 3/2005 | Pryor | 463/36 |
| 2005/0103877 A1 * | 5/2005 | DeLuca | 236/94 |
| 2005/0194457 A1 | 9/2005 | Dolan | |

OTHER PUBLICATIONS

Theta Engineering, "Smart" Thermostat, website, date visited Oct. 26, 2006, previously visited Oct. 27, 2005, 3 pages, http://www.thetaeng.com/SmartThermostat.htm.

* cited by examiner

ROTATABLE THERMOSTAT

FIELD OF THE INVENTION

This invention generally relates to heating, ventilation, and air conditioning systems and, more particularly, to thermostats employed in those systems.

BACKGROUND OF THE INVENTION

Occupants of dwellings and commercial structures have long benefited from the inclusion of a heating, ventilating, and air conditioning (HVAC) system that regulates the temperature and humidity within the dwelling or structure. Traditionally, a thermostat that controlled this temperature regulating equipment was a fairly simple electromechanical device wired to a heating device and/or to a cooling device. Once installed, the user need only move a selector switch between heating and cooling to designate which equipment was desired to be operated, move a selector switch between run and auto for a fan control, and rotate a dial to a desired set point temperature. No other user interface to the basic thermostat was needed or available.

Advances in control electronics have allowed the development of new, digital thermostats that may be programmed by a user to control the heating and cooling equipment in a much more energy efficient manner than the older electromechanical devices. These modem digital thermostats allow programming that can automatically set back the heat, for example, during periods when the dwelling or structure is not occupied, and can turn up the heat just prior to and during periods of occupation of the dwelling or structure. Indeed, many such digital thermostats allow for different programming options during different days of the week. For example, such a digital thermostat may provide for one programmed operation during the week and a different programmed operation on the weekend, to accommodate the different usage patterns of the occupants of that particular dwelling or structure. These digital thermostats are continually being improved and the newest model frequently includes additional and improved features not found on a prior model.

As one thermostat becomes obsolete and/or outdated, that unwanted thermostat is often replaced with another thermostat. In some cases, the simple electromechanical or analog thermostat is replaced with a new digital thermostat. In other circumstances, a digital thermostat is replaced by a new model that offers more features, more efficient control of the HVAC system, and the like.

Unfortunately, when one thermostat is replaced with another, property owners and tenants are discovering that the replacement thermostat does not always fit into the space recently vacated by the previous thermostat. Should this occur, an entirely different model of thermostat, which will fit within the existing space, may have to be obtained and used. If using an alternate style of thermostat is not an option, the existing space may have to somehow be expanded. Each of these remedies will undesirably add both time and expense to the process of replacing one thermostat with another.

In addition to the above, property owners and tenants are also finding that a replacement thermostat may not cover the same portion of the wall as the old thermostat when mounted. In such cases, an unsightly halo (e.g., a ring or pane of discolored paint or wallpaper) is exposed on the surface of the wall where the previous thermostat had been mounted. To hide the unattractive and aesthetically displeasing halo, a wall plate that covers an area larger than the original thermostat can be installed along with the replacement thermostat. However, if such a wall plate is not available or is simply an unacceptable method of concealing the halo, the property owner or tenant may have to replace wallpaper, apply new paint to all or a portion of the wall, add new trim, and the like. Again, each of these solutions will undesirably add both time and expense to the process of replacing one thermostat with another.

To address such problems, digital thermostats that are capable of being mounted in two different configurations have been developed. Such thermostats may be mounted in a horizontal configuration wherein a long axis of its rectangular housing is mounted horizontally, and in a vertical configuration wherein the long axis of its rectangular housing is mounted vertically, rotated 90° clockwise from the horizontal configuration. In the first mounting configuration, the display is on the left of the user input buttons and switches, and in the second mounting configuration, the display is above the user input buttons and switches.

Unfortunately, to provide the information to the user in a proper orientation based on the mounting configuration, the user is required to separate the thermostat housing from the mounting plate and manipulate an electrical jumper located in the controller of the thermostat. However, many consumers are unfamiliar with electronics and are uncomfortable rewiring the controller of the thermostat with an electrical jumper. Further, if the rewiring is not done correctly, the display is not likely to be correct. Also, if the jumper is not seated firmly in place, the connection may become intermittent, which could result in an erroneous display orientation.

A further problem may also be realized when the occupant or user who is left handed replaces such a round analog thermostat with a new digital thermostat. While the user interface on the round thermostat was located centrally around the temperature display, many new digital thermostats have the user interface located on the right side of the display. While this allows a right handed user to adjust the thermostat via the user interface and still see the display, a left handed user tends to obstruct the display as they are required to reach across the display to manipulate the user interface. Alternatively, the user is forced to manipulate the user interface with their right hand, which is not comfortable or natural for the left-handed user. These issues tend to detract from the user experience with the new thermostat and may result in product returns.

Unfortunately, the previously discussed thermostats that allow for mounting in two different configurations also includes labeling on the housing itself to identify the function of certain buttons, switches, etc. of the thermostat. Such labeling is provided in a manner such that it can be read by the user in either of the two mounting orientations. As a result, mounting the thermostat in any other orientation, such to allow a left handed user to use the thermostat, will result in the labeling being upside down.

There exists, therefore, a need in the art for a thermostat that is adaptable to fit within an existing space vacated by a previously used thermostat, to conveniently and inexpensively cover the footprint of the previously used thermostat, and to be operable by either right or left handed users obstructing the display thereof. The invention provides such a thermostat. These and other advantages of the invention, as well as additional inventive features, will be apparent from the description of the invention provided herein.

BRIEF SUMMARY OF THE INVENTION

In view of the above, the present invention provides a new and improved thermostat that overcomes one or more problems existing in the art. More particularly, the present invention provides a new and improved thermostat that is adaptable to fit within an existing space vacated by a previously used thermostat. Even more particularly, the present invention provides a new and improved thermostat that is able to conveniently and inexpensively cover the footprint of the previously used thermostat without the need for a wall plate, new wallpaper, new paint, and/or new trim. Still more particularly, the present invention provides a new and improved thermostat that is configurable to orient the user interface and the display for use by either right or left handed users.

In one embodiment, the present invention provides a thermostat. The thermostat comprises a housing, a controller, a display, and an input device. The housing is adapted to be mounted in at least a first and a second orientation. The controller is positioned within the housing. The display is visibly mounted in the housing and is capable of exhibiting information thereon. The input device is operatively mounted through the housing to allow user manipulation thereof. The controller is programmed to provide the information to the display in a display orientation that corresponds to at least the first and the second orientation of the housing.

In another embodiment, the present invention provides a thermostat. The thermostat comprises a housing, a display in the housing, and an input device in the housing. The display is adapted to exhibit information in a variety of different orientations. The information includes a selectable list that includes the variety of different orientations. The input device is adapted to permit selection of a desired orientation from the selectable list. As such, the exhibited information is oriented as desired.

In yet another embodiment, the present invention provides a method of mounting a thermostat having a display on which information is exhibited to a user. The method comprises the steps of determining a desired orientation for mounting the thermostat, mounting the thermostat in the desired orientation, and inputting the desired orientation into the thermostat. As such, information displayed on the thermostat has the desired orientation.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
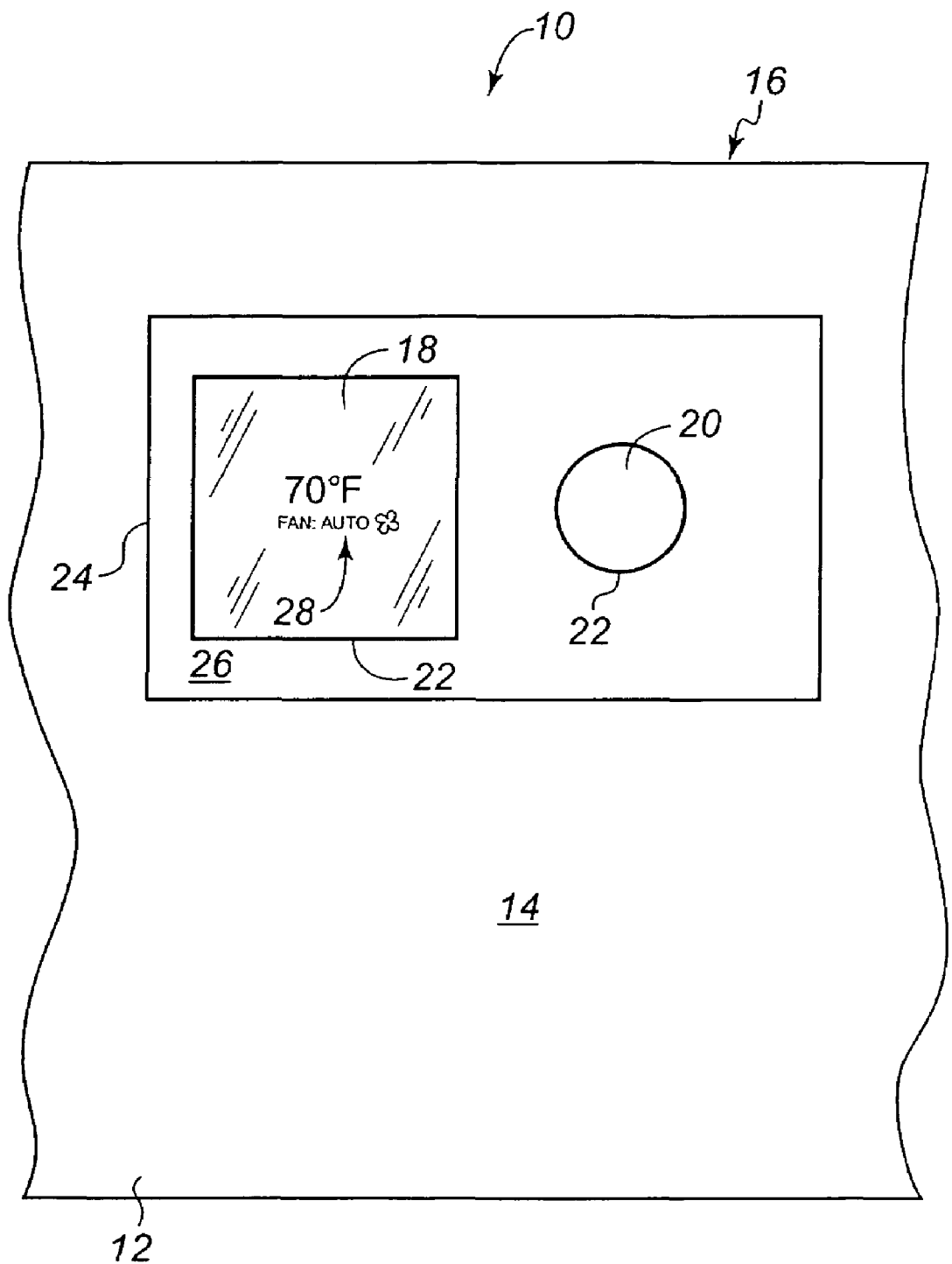
FIG. 1 is a front elevation view of view of an exemplary embodiment of a thermostat constructed in accordance with the teachings of the present invention.

Referring to FIG. 1, an embodiment of a temperature control device, such as thermostat 10, constructed in accordance with the teachings of the present invention is shown. As described above, such a thermostat 10 is often mounted to a wall 12 whose outer surface 14 has previously been painted and/or wallpapered around an older mechanical thermostat. In such a situation, as will be described more fully below, the thermostat 10 needs to cover the prior area of the old thermostat. The thermostat 10 of the present invention is particularly suited for such applications. However, one skilled in the art will recognize from the following description that such a thermostat 10 may also or alternatively be installed initially in new construction, and in such installations additional advantages will become apparent.

The thermostat 10 includes a housing 16, a user interface device, e.g. display 18, and a user input device 20. The housing 16 generally includes or interfaces with mounting hardware or components (not shown) that permit the thermostat 10 to be secured to the wall 12. The housing 16 may be formed from a variety of different suitable materials such as, for example, a plastic or a thin metal. The housing 16 is provided with apertures 22 sized and dimensioned to receive the display 18 and to accommodate the input device 20 therethrough. The housing 16 defines an outer periphery 24 best observed by looking toward a front surface 26 of the thermostat 10 when that thermostat has been mounted to the wall 12 as depicted in FIG. 1. The outer periphery 24 can have a variety of different shapes. For example, the outer periphery 24 may be round, square, rectangular, etc. Preferably, the outer periphery 24 is configured such that it will be aesthetically pleasing when it is mounted in orientations that are rotated 90° with respect to one another.

In the illustrated embodiment of FIG. 1, the user input device 20 is a rotatable knob. Such an input device 20 may freely rotate in one or both directions, or may be resiliently angularly biased to a neutral position to allow user adjustment of the thermostat settings. In the later embodiment, the knob may be rotated by a user only though a small arc in one or both directions. When the user releases the knob, it returns to its neutral position. To change the thermostat settings, the user simply rotates the knob in one direction through the small arc and the thermostat 10 scrolls through the available settings on display 18. Rotation of the knob in the other direction will scroll through the available settings in the other direction.

The user interface display 18 displays the characters, text, symbols, icons, images, graphics, and the like, collectively referred to as information 28, for the user. In embodiments of the present invention, the information 28 may provide the user with the operating mode, temperature set point, current temperature, and/or an indication of the operation of the fan, etc. Preferably, the display 18 is a dot-matrix display that uses an array of dots to display the information 28. In other embodiments, the display 18 may be utilize other technologies to provide the user with the information 28, e.g. a liquid crystal display (LCD), etc. The display 18 can be black and white, color, etc.

Advantageously, as will be described more fully below, as the thermostat 10 is oriented for mounting on the wall 12, the thermostat 10 manipulates the orientation of the information 28 on the display 18 so that it is displayed in a correct orientation for the user to view. As illustrated in FIG. 1, the thermostat 10 is mounted on the wall 12 in a right-handed orientation. In such an orientation the display 18 is positioned to the left of the input device 20 to allow the user to use his or her right hand to manipulate the input device 20 without obstructing the view of the display 18. In this orientation the information 28 is displayed in a horizontal orientation that allows the user to view the text and graphics correctly, i.e. right side up not upside down or sideways.

Figure 2:
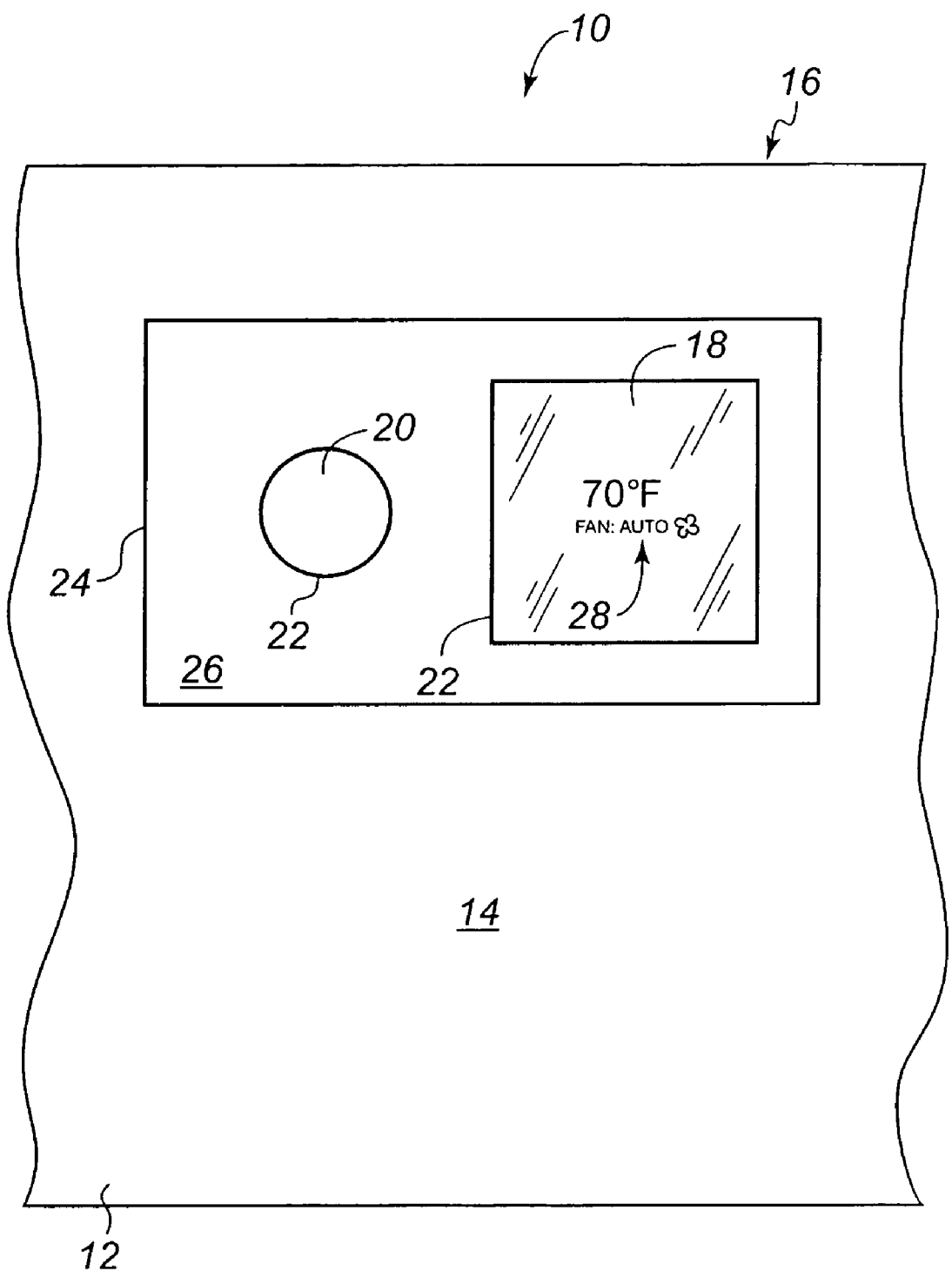
FIG. 2 is a front elevation view of the thermostat of FIG. 1 in an alternate orientation.

If, however, the thermostat 10 were oriented for mounting on the wall 12 as shown in FIG. 2, the display 18 would be positioned to the right of the input device 20. In this orientation, a user could manipulate the input device 20 with his or her left hand without obstructing the display 18. Such obstruction is typical for left-handed people with most thermostats since these thermostats typically position the user inputs on the right of the display. However, since the thermostat 10 has the ability to reorient the information 28 on the display 18 regardless of the thermostat's mounting orientation, this problem does not occur with the thermostat 10 of the present invention. Specifically, the thermostat 10 can display the information 28 in a horizontal orientation that is upside down compared to the orientation used for the information 28 displayed in FIG. 1. However, since the thermostat 10 is mounted in a left-handed orientation in FIG. 2 positioning the input device 20 to the left of the display 18, the information 28 once again is displayed correctly to the user.

While the right- and left-handed orientations of the embodiment of the thermostat 10 discussed above orient the thermostat 10 generally in a horizontal orientation, there are situations and user preferences that may dictate a different orientation of the thermostat 10. One such situation may be dictated by the prior thermostat mounting that may leave a ring of unpainted or wallpapered area which the present thermostat must cover.

Figure 3:
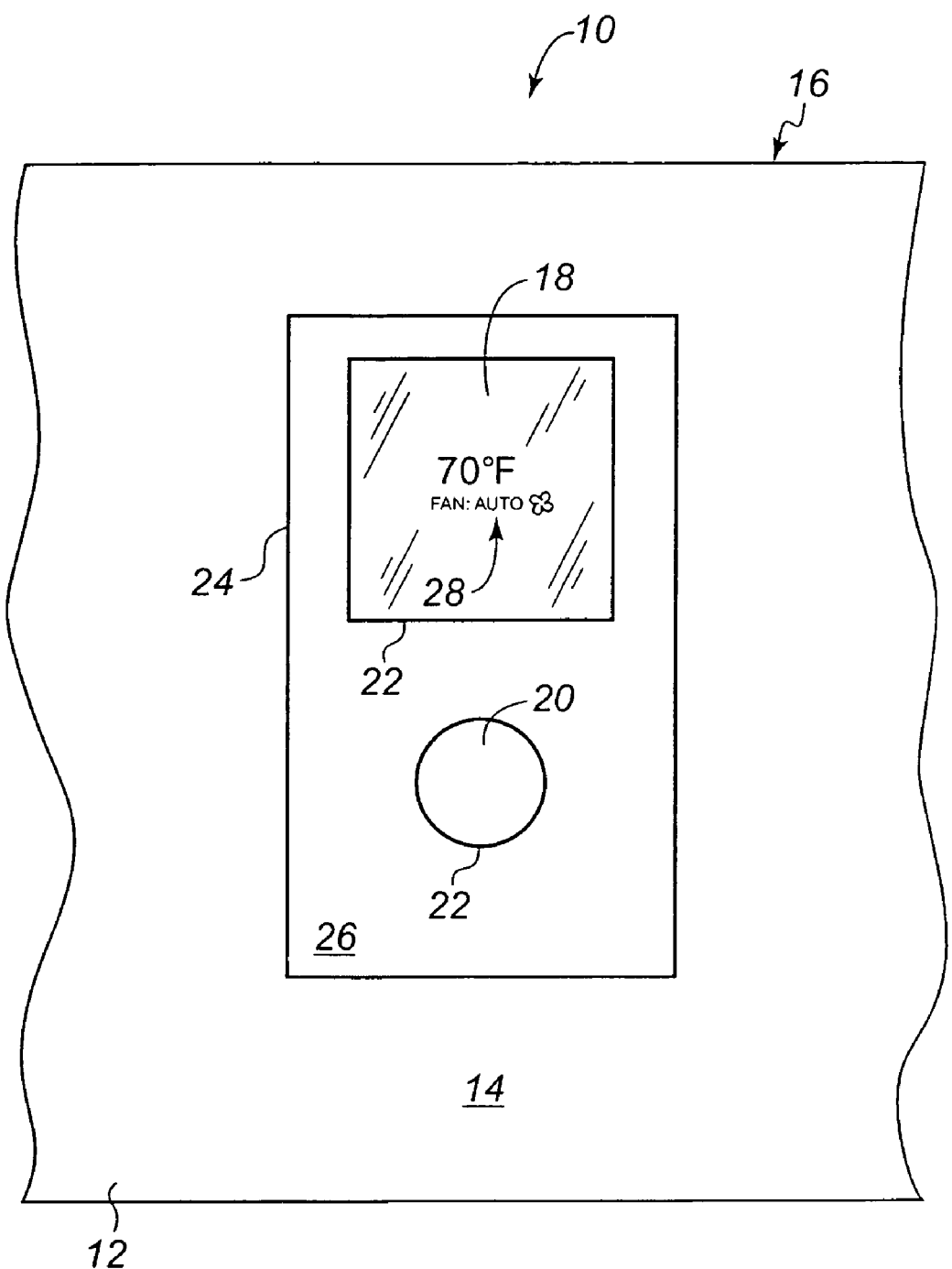
FIG. 3 is front elevation view of the thermostat of FIG. 1 in another alternate orientation.

In such situations as well as others, the user may choose to mount the thermostat 10 to the wall 12 in what could be considered a vertical orientation, such as that shown in FIG. 3. In this orientation, the thermostat 10 would reorient the information 28 on the display 18 so that it would be displayed to the user correctly. In the embodiment illustrated in FIG. 3, the display 18 is oriented vertically above the input device 20. This would allow the typical user to manipulate the input device 20 with either the right or left hand without obstructing the view of the display 18.

Although not shown, thermostat 10 could be mounted in an vertical orientation that is 180° from that illustrated in FIG. 3. Such an orientation would allow users of smaller stature to manipulate the input device 20 without obstructing their view of the display 18. In other words, the display 18 in this orientation is positioned vertically below the input device 20. This is particularly helpful to people whose eye level is below the typical mounting location of the thermostat 10. As those skilled in the art will appreciate from the foregoing, other orientations for the information 28 on the display 18 are also possible.

In addition to or in place of the operational and status information 28, the display 18 may also be used to display one or more of the features or programs available though the thermostat 10. In that regard, the thermostat 10 is able to generate and display on display 18 a list, directory, menu, and the like, to a user. At least one of these lists, directories, or menus preferably includes an option to allow manual selection of one of all of the available display orientations for the thermostat 10. This will allow the user to select which of the available display orientations is desired based on how the user is going to mount the thermostat 10. Additionally or alternatively, the thermostat 10 may automatically sense the mounting orientation and automatically adjust the display orientation to correctly display the information.

As discussed above, the input device 20 is adapted to permit selection of various control and other options, including in one embodiment, a desired orientation from the variety of different orientations that are available. The input device 20 can be a rotary dial, a pair of depressible arrows keys, a group of buttons, and the like, as well known to those skilled in the art. As will be discussed more fully below with respect to FIG. 4, the input device 20 can also be a touch screen to combines the display and user input functionality. Through the input device 20, a user is able to, for example, scroll through or select the variety of different orientations that are exhibited on the display 18. Using the input device 20, the user can survey and choose desired features of the thermostat 10 as well as offered display orientations.

In operation, the thermostat 10 can be advantageously positioned such that the thermostat fits into a variety of different positions on a wall. For instance, should an end of the wall or a piece of trim limit the horizontal space available to the thermostat 10, the thermostat can be easily rotated 90° to adjust to the lack of horizontal space and still remain functional by virtue of the adjustable orientation of the display 18.

The rotatable thermostat 10 can also be advantageously employed to cover and/or conceal the halo or footprint left after a previously used thermostat has been removed from the wall. To do so, a user of the thermostat 10 first generally aligns the thermostat with the footprint left by the removed thermostat in an effort to gauge the footprint relative to the housing 16. The visual inspection may reveal, for example, that either a vertical alignment or a horizontal alignment is best to cover the footprint.

Once the desired orientation has been determined, the thermostat 10 is securely mounted to the wall 12 in the desired orientation. When mounted in the desired orientation, the outer periphery 24 of the housing 16 preferably extends outside of and beyond the footprint and/or halo that remains from removal of the previous thermostat. Therefore, the aesthetically pleasing quality of the surface of the wall or other structure is maintained. With the electrical connections made, the display 18 is powered and can exhibit information 28, lists, directories, and the like.

With the thermostat 10 satisfactorily mounted, the input device 20 is employed in one embodiment by the user to input the desired orientation into the thermostat 10. In a preferred embodiment, the input device 20 is used to scroll through the list or directory of available orientations that are prominently exhibited on the display 18. For example, if the input device 20 is a rotary dial, the dial is turned until the desired orientation selection is highlighted on the display 18 and, once highlighted, the rotary dial is depressed or otherwise manipulated to choose the currently highlighted option.

Based on the desired orientation that has been input into the thermostat 10 using the input device 20, the information 28 provided on the display 18 is appropriately oriented relative to the orientation of the housing 16 and/or the thermostat 10. In other words, the display 18 changes the orientation of the information 28 relative to the desired orientation that was input into the thermostat 10 using the input device 20. Therefore, no matter what orientation the thermostat 10 has with respect to the wall 12, the information 28 shown on the display 18 appears as expected by the user. Also, since the thermostat 10 has been rotated into the desired orientation, the footprint or unsightly halo is hidden from view.

Figure 4:
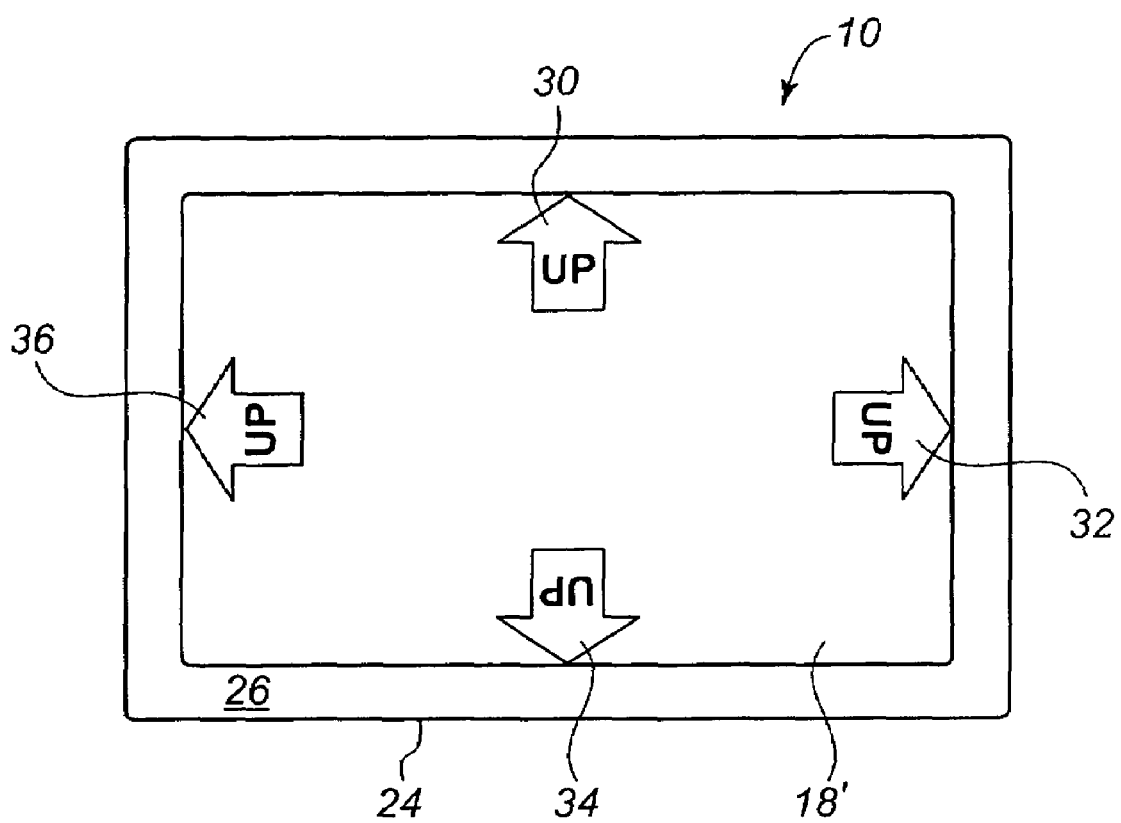
FIG. 4 is a front elevation view of an alternate embodiment of a thermostat constructed in accordance with the teachings of the present invention that includes a touch screen display and input device.

In the embodiment of the present invention illustrated in FIG. 4, the thermostat 10 includes a touch screen 18' that incorporates the display and user input functionality of the previous embodiment. Specifically, the touch screen 18' serves to display the information to the user, and is also capable of receiving user input, as is well known in the art. The display of information in this embodiment is also controlled so as to present the information to the users in the correct orientation based on the orientation of the housing of the thermostat.

While one embodiment senses the orientation of the housing to automatically display the information on the touch screen 18' in the proper orientation, the embodiment illustrated in FIG. 4 provides an orientation setup screen or display that allows a user to input the desired orientation of the information. As shown in this FIG. 4, this embodiment of the thermostat 10 displays at least two, and preferably four, "up" arrows 30, 32, 34, 36 on the orientation setup screen. The user simply touches one of the arrows 30, 32, 34, 36 displayed on the touch screen 18' which corresponds to the mounting position of the thermostat 10. The thermostat 10 thereafter will display the information on the touch screen 18' in an orientation that corresponds to this mounting orientation, unless subsequently changed by the user. It should be noted that other, user selectable icons or menu items may be provided on the touch screen 18' to provide the user orientation selectability without departing from the spirit and scope of the invention.

As illustrated by the foregoing, the thermostat 10 is adapted to easily fit in a variety of spaces as well as conveniently and inexpensively cover the footprint of a replaced thermostat without the need for a wall plate, new wallpaper, new paint, and/or new trim. Thus, the thermostat 10 is able to reduce the time and expense incurred during the process of replacing one thermostat with another thermostat.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermostat, comprising:
   a housing adapted to be mounted in at least a first and a second orientation;
   a controller positioned within the housing;
   a display visibly mounted in the housing, the display capable of exhibiting information thereon, wherein the information includes at least one menu of available options for operation of the thermostat, and at least one of the at least one menu includes user-selectable orientations for display of the information on the display;
   an input device operatively mounted on the housing to allow user manipulation thereof when the housing is mounted in at least the first and the second orientation, wherein the input device is adapted to permit selection of a desired orientation from at least the first and the second orientation, and wherein the input device includes a rotary knob that may be rotated to select between at least the first and the second orientation; and
   wherein the controller is programmed to provide the information to the display in a display orientation that corresponds to at least the first and the second orientation of the housing.

2. The thermostat of claim 1, wherein the controller senses at least the first and the second orientations of the housing and provides the information to the display in the display orientation that corresponds to at least the first and the second orientation sensed.

3. The thermostat of claim 2, wherein the housing is adapted to be mounted in a plurality of orientations between 0° and 360° of a reference orientation.

4. The thermostat of claim 3, wherein the controller is programmed to provide the information to the display in a display orientation that varies between 0° and 360° of a reference orientation corresponding to the orientation of the housing.

5. The thermostat of claim 4, wherein the controller is programmed to provide the information to the display in the display orientation that varies in four discrete steps between 0° and 360° of a reference orientation corresponding to the orientation of the housing.

6. The thermostat of claim 1, wherein the display is a dot-matrix display.

7. The thermostat of claim 1, wherein the display is a liquid crystal display (LCD).

8. The thermostat of claim 1, wherein the housing is adapted to be mounted in at least a third and a fourth orientation, and wherein the controller is programmed to provide the information to the display in the display orientation that corresponds to at least the third and the fourth orientation of the housing.

9. The thermostat of claim 1, wherein the display orientation includes at least one vertical orientation and at least one horizontal orientation.

10. The thermostat of claim 1, wherein the input device comprises at least one depressible button.

11. The thermostat of claim 1, wherein the input device is positioned on one side of the display.

12. The thermostat of claim 1, wherein the input device and the display comprise a touch screen.

* * * * *